J. P. WARWAS.
POTATO DIGGER.
APPLICATION FILED JUNE 4, 1915.

1,187,873.

Patented June 20, 1916.

Inventor
J. P. Warwas.

UNITED STATES PATENT OFFICE.

JULIUS P. WARWAS, OF MONTROSE, MINNESOTA.

POTATO-DIGGER.

1,187,873.  Specification of Letters Patent.  Patented June 20, 1916.

Application filed June 4, 1915. Serial No. 32,119.

*To all whom it may concern:*

Be it known that I, JULIUS P. WARWAS, a citizen of the United States, residing at Montrose, in the county of Wright and State of Minnesota, have invented certain new and useful Improvements in Potato-Diggers; and I do hereby declare the following to be a full, clear, and exact description of the invention, such as will enable others skilled in the art to which it appertains to make and use the same.

This invention relates to a potato digging attachment for cultivators, and the primary object of this invention is to provide a device applicable for attachment to the plow carrying standards of an ordinary cultivator, for digging or uprooting potatoes, analogous vegetables or agricultural products.

Another object of this invention is to provide a device as specified, which includes an uprooting blade or shovel, and a plurality of tines or fingers pivotally connected to the upper end of the shovel and extending rearwardly therefrom, for guiding the potatoes or vegetables from the uprooting shovel, for deposit upon the ground rearwardly of the shovel, and further to space the pivotally supported fingers or tines, to permit the small or loose dirt to fall therebetween.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:—

Figure 1:
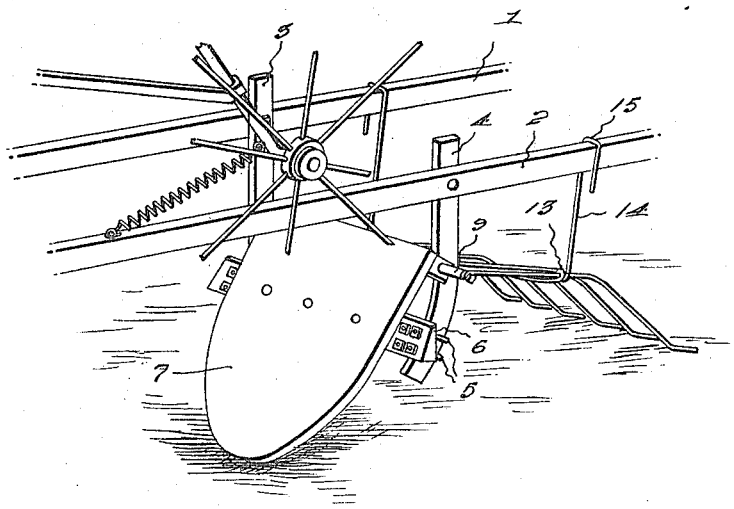
Figure 2:
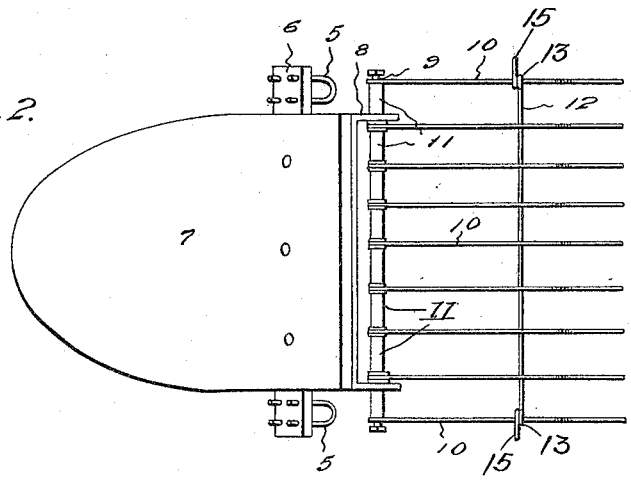

Figure 1 is a detail perspective view of the invention, showing the same applied to a fragment of a cultivator, and Fig. 2 is a top plan view of the invention.

Referring more particularly to the drawings, 1 and 2 designate the shovel carrying beams of a cultivator, which have the ordinary shoe or shovel carrying standards 3 and 4 connected thereto. In applying the improved potato digger to a cultivator, the shovels are removed from the standards, and the U-shaped bolts 5 are mounted about the standards, as is clearly shown in Fig. 1 of the drawing. The U-shaped bolts 5 are carried by a wedge shaped bar 6, which is secured to the under surface of the shovel 7, intermediate of its ends. The bar 6 is wedge shaped, for positioning the shovel 7 at the proper angle for uprooting the potatoes or like vegetables. The shovel 7 has a substantially U-shaped bracket 8 secured to the under surface of its rear upper edge, which bracket rotatably supports a pin or shaft 9. The pin or shaft 9 has a plurality of tines 10 pivotally secured thereto and held in proper spaced relation by means of spacing collars 11. The tines 10 extend rearwardly from the shaft 9, and they are bent downwardly and outwardly, as is clearly shown in Fig. 1 of the drawing, so as to receive the potatoes from the shovel 7, and carry them rearwardly for deposit upon the upper surface of the ground in the rear of the cultivator.

The outermost tines 10 have a length of wire 12 secured thereto, by coils 13, which are formed in the length of wire 12 intermediate of its ends. The ends of the strand or length of wire 12 are bent upwardly, from the coils 13, as is shown at 14 in Fig. 1 of the drawings, and they are bent to form hooks 15. The hooks 15 are inserted over the beams 1 and 2 of the cultivator, for supporting the tines, rearwardly of the plow. The length of wire 12 passes beneath the intermediate tines 10, so as to limit the downward movement of the tines and permit of an upward oscillatory or pivotal movement of the tines upon passage over the ground, which provides a sufficient shaking action to the tines, to cause the loose particles of dirt to drop free from the potatoes and fall downwardly beneath the tines, while the potatoes travel rearwardly over the upper surface of the tines and are deposited upon the ground rearwardly of the cultivator.

In reducing the invention to practice, certain minor features of construction, combination, and arrangement of parts may necessitate alteration, to which the patentee is entitled, provided such alterations are comprehended within the scope of what is claimed.

What is claimed is:—

1. In a potato digging attachment for ordinary cultivators, a wedge-shaped bar, a plurality of U-shaped bolts carried by said bar for connecting the bar to ordinary shovel standards, and an uprooting shovel carried by said bar.

2. In a potato digging attachment for ordinary cultivators, a wedge-shaped bar, a plurality of U-shaped bolts carried by said bar for connecting the bar to the ordinary shoe supporting standards, an uprooting shovel carried by said bar, and a plurality of tines pivotally connected to the upper rear edge of said shovel and extending rearwardly therefrom.

3. In a potato digging attachment for ordinary cultivators, a wedge-shaped bar, a plurality of U-shaped bolts carried by the ends of said bar for connecting the bar to ordinary shovel carrying standards, an uprooting shovel carried by said bar, a rod carried by the upper rear end of said shovel, a plurality of tines pivotally connected to said rod and extending rearwardly therefrom, means connected to said tines for limiting their downward pivotal movement.

4. In a potato digging attachment for ordinary cultivators, a wedge-shaped bar, a plurality of U-shaped bolts carried by the ends of said wedge-shaped bar for connecting the bar to the ordinary shovel carrying standards, an uprooting shovel carried by said bar, a U-shaped bracket secured to the under surface of the upper rear end of said shovel, a rod carried by said bracket, a plurality of rearwardly extending tines pivotally supported by said rod, spacing collars for holding said tines in proper spaced relation with respect to each other, a strand of wire connected to the outermost of said tines and extending across beneath the intermediate tines, said strand of wire having its ends bent upwardly and bent to form hooks for engaging the ordinary shovel standard carrying beams of a cultivator.

In testimony whereof I affix my signature in presence of two witnesses.

JULIUS P. WARWAS.

Witnesses:
  OSCAR A. SCHULTZ,
  E. W. SWANSON.

Copies of this patent may be obtained for five cents each, by addressing the "Commissioner of Patents, Washington, D. C."